Sept. 30, 1958   W. F. K. J. NIKLAS ET AL   2,854,607
MAGNETIC DEVICE
Filed Oct. 20, 1953
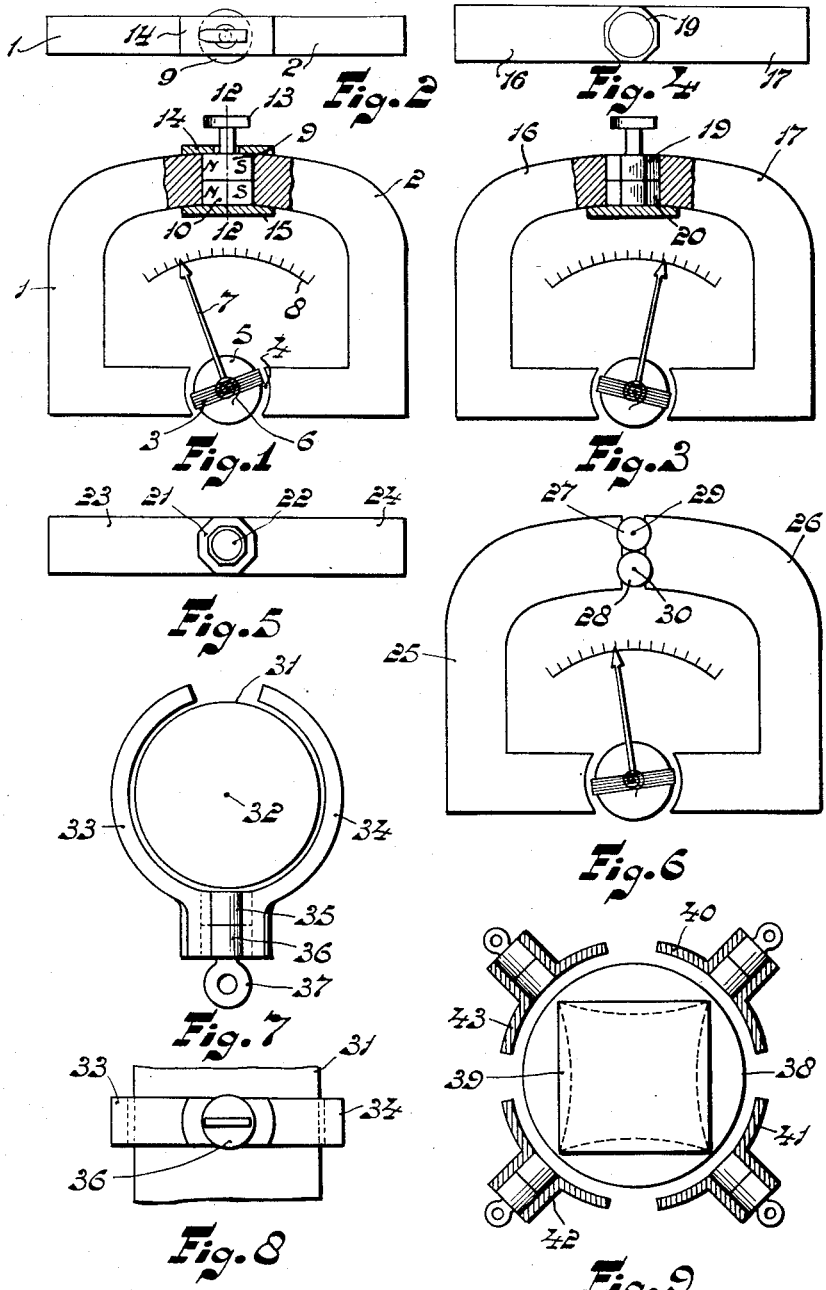
INVENTORS
WILFRID FRANZ KONRAD JOHANN NIKLAS
ALPHONSUS PETRUS VAN ROOY
JAN VAN WIJNGAARDEN
BY
AGENT United States Patent Office 2,854,607
Patented Sept. 30, 1958

2,854,607

MAGNETIC DEVICE

Wilfrid Franz Konrad Johann Niklas, Alphonsus Petrus Van Rooy, and Jan Van Wijngaarden, Eindhoven, Netherlands, assignors, by mesne assignments, to North American Philips Company, Inc., New York, N. Y., a corporation of Delaware Application October 20, 1953, Serial No. 387,286

Claims priority, application Netherlands November 18, 1952

6 Claims. (Cl. 317—158)

This invention relates to magnetic devices producing controllable magnetic fields.

In many domains of engineering permanent magnets with associated pole-shoes are used for very different devices. Reference may be made, by way of example, to measuring instruments, small motors, high frequency coils comprising each a pre-magnetized core, and devices for acting on the position of a cathode ray in a cathode-ray tube, for example, for so-called ion traps or for centering purposes. The magnetic field strength between the pole-shoes in such instruments or devices varies with the strength of one permanent magnet. In general, use is made of a permanent magnet rigidly secured to the pole-shoes. In order to control the field between the pole-shoes, use has been made of a so-called magnetic shunt, which short-circuits the space between the pole-shoes to a greater or smaller extent. Such a shunt is known, for example, in measuring instruments. The control of the field strength by means of a shunt has a limitation in that the attenuation of the field takes place in accordance with an asymptotic curve and in that the possibility of control is only small.

In the case of a magnet for acting upon the position of the cathode ray in a cathode-ray tube, it is known to use a magnet comprising a cylinder, located between the pole-shoes, polarized transversely to its axis and rotatable about this axis.

Such a rotatable magnet provides a non-asymptotic control and thus constitutes an improvement over the magnetic shunt; however, it has a limitation in that the adjustment is very coarse, since the angle of rotation of the magnet is restricted to 90°, the polarity of the field between the pole-shoes being reversed upon further rotation.

A magnet construction in accordance with the invention reduces the aforesaid limitations to a material extent and particular advantages, to be explained hereinafter, are at the same time obtained.

A permanent magnet having pole-shoes according to the invention has a magnet comprising two parts, which are adjustable relatively to one another in a manner such that the magnetic fields of the two magnets amplify or attenuate one another.

The term "adjustable" is to be understood to mean herein that the magnets are displaceable, for example, rotatable relative to one another by a movement clearly involved in the construction. This term, consequently, is not to be understood to mean the provision of a separate magnet, not associated with the device proper, for temporary amplification or attenuation of the field of a permanent magnet, for example, for carrying out experiments.

For the said purpose the two magnets may be adjustable, for example, rotatable or one of the magnets may be secured rigidly to the pole-shoes.

The maximum control-range is obtained, if the two magnets have substantially equal strengths, since if in this case the two fields are opposite one another, the field strength between the pole-shoes will be substantially zero. The maximum field strength is invariably equal to the sum of the field strengths produced by each of the two magnets.

Since, with the exception of the position in which the maximum field strength is obtained, the direction of the magnetic moments of the two magnets are at an angle not equal to zero to one another, it is advantageous to manufacture the magnets from such a material that they do not permanently demagnetize one another. Therefore ceramic type of magnetic materials, such as that known under the trade name of "ferroxdure," are very suitable. It is known that the name "ferroxdure" designates a group of compounds having hexagonal crystal structure and satisfying the formula $MO.6Fe_2O_3$, wherein M designates one or more of the elements barium, strontium, lead or calcium.

Calcium can be used only in conjunction with one of the other elements. Sometimes such compounds are termed magneto-plumbites.

In order that the invention may be readily carried into effect, it will be described with reference to the accompanying drawing which shows a few embodiments of a magnet with the associated pole shoes according to the invention and the use thereof. In the drawing:

Fig. 1 is a front view and partly a sectional view of a moving-coil measuring instrument;

Fig. 2 is a plan view of the instrument shown in Fig. 1;

Fig. 3 is a front view of a measuring instrument similar to that shown in Fig. 1, however, comprising a different magnet construction;

Fig. 4 is a plan view of the measuring instrument shown in Fig. 3;

Fig. 5 is a plan view of a different embodiment of a measuring instrument as shown in Fig. 1 or 3;

Fig. 6 is a front view of a different embodiment of a measuring instrument as shown in Figs. 1 and 3;

Fig. 7 is a sectional view of a permanent magnet with pole shoes, suitable for acting upon the position of a cathode ray in a cathode-ray tube;

Fig. 8 is a bottom view of the construction shown in Fig. 7; and

Fig. 9 is a front view of a cathode-ray tube, which is surrounded by a plurality of magnets with pole shoes according to the invention.

Referring to Fig. 1, reference numerals 1 and 2 designate the pole-shoes, i. e., soft, magnetic, core portions, of the moving-coil meter. In the cylindrical air gap 4 between the pole-shoes 1 and 2 a cylindrical core 5 is adapted to rotate the coil 3. Reference numeral 6 designates a helical spring which serves to produce the counter-acting torque and for supplying current to the coil 3. Reference numeral 7 designates the pointer moving along a dial 8. At the end of the pole-shoes 1 and 2 opposite the coil provision is made of the magnet system comprising the two co-axial cylindrical parts 9 and 10. As is more evident from the plan view of Fig. 2 the pole-shoes 1 and 2 are provided with a cylindrical recess, in which are housed the cylindrical magnets 9 and 10, polarized transversely to the axis 12—12. If the positions of the two magnets 9 and 10 are such that their same poles engage the same pole-shoes, the maximum field strength is obtained in the air gap 4. If one of the two magnets, for example, the magnet 10, is left in this position and if the magnet 9 is turned about the axis 12—12, the field in the air gap 4 is gradually attenuated, until the magnets 9 and 10 have opposite directions. In order to facilitate the rotation of the magnet 9, it is provided with a handle 13. The angle of rotation of the magnet 9 from the maximum field strength to the minimum field strength is thus 180°. If desired, the magnet 10 may be secured rigidly to the pole-shoes 1 and 2. If the magnetic strengths of the magnets 9 and 10 are substantially equal, the magnetic field strength in the air gap 4 will vary from the maximum value to a value substantially equal to zero. Thus a measuring instrument is obtained, having a large measuring range, the internal resistance remaining constant. Since in the position in which the two magnets have opposite directions, a force occurs tending to move the magnets from one another, provision may be made of guard plates 14 and 15 of non-magnetic material to hold the magnets in operating positions. If one of the magnets is secured rigidly to the pole shoes, one guard plate will suffice. If it is not desired to have a continuous measuring range, but to have a plurality of fixed measuring ranges, for which purpose the associated dial division may be indicated, provision may be made of stop devices known per se.

Fig. 3 shows a measuring instrument of a construction similar to that shown in Fig. 1, comprising a plurality of fixed measuring ranges, a separate stopping device for the adjustable magnet not being required. Between the pole shoes 16 and 17 of this measuring instrument provision is made on the side remote from the moving coil of an octagonal aperture, in which are housed two octagonal prismatic magnets 19 and 20. One of these magnets or both of them may be taken out of the aperture and re-introduced into it after having been rotated. Thus five fixed measuring ranges are obtained. Use may, of course, be made of prisms having more or less than eight sides, so that a corresponding higher or lower number of fixed measuring ranges is obtained.

It is not necessary that the two co-axial magnets should be in line with one another, since, as is evident from Fig. 5, one of the magnets 21 may be shaped in the form of a hollow octagonal prism, the other magnet 22 having the shape of a solid straight or right prism fitting therein. The magnet 21 for example, may be secured rigidly to the pole-shoes 23 and 24 and the magnet 22 may be drawn out of the magnet 21, turned and re-introduced into the magnet 21 in a different position.

The construction shown in Fig. 5 may, of course, as an alternative, be provided with a magnet shaped in the form of a hollow cylinder and a magnet constituted by a solid cylinder fitting therein.

Fig. 6 shows one embodiment of a measuring instrument, in which the two magnets are not co-axial, but have parallel axes. Between the pole-shoes 25 and 26 provision is made of two cylindrical apertures, in which are housed permanent magnets 27 and 28. These magnets are polarized transversely to the axes 29 and 30, at right angles to the plane of the drawing and rotatable about these axes. As in the embodiments described above, one of the magnets may be secured rigidly to the pole-shoes and use may be made of prisms instead of cylinders.

Fig. 7 shows one embodiment of the invention, which is suitable for acting upon the position of a cathode ray in a cathode-ray tube. Reference numeral 31 designates the sectional area of the neck of a cathode-ray tube, which comprises the cathode ray 32. The neck 31 is surrounded by two pole-shoes 33 and 34, which surround on one side the magnets 35 and 36. As is more evident from the bottom view of Fig. 8, provisions is made of a cylindrical aperture between the pole-shoes, in which the magnet 35 is secured rigidly, while the magnet 36 is rotatable by means of the handle 37. In contradistinction to the known construction referred to above, in which a single rotatable magnet is provided between pole-shoes of a form substantially similar to that shown in Figs. 7 and 8, the field strength in the construction according to the invention may be controlled from a value of substantially zero to a maximum value by turning the magnet 36 through an angle of 180°. Thus a more sensitive adjustment of the field strength is obtained to act upon the position of the ray 32. As a matter of course, all details of the constructions described with reference to Figs. 1 to 6 may also be used in the construction shown in Figs. 7 and 8.

Referring to Fig. 9, reference numeral 38 designates the window of a cathode-ray tube, on which a television image 39 is displayed. For various reasons this image may exhibit so-called pincushion distortions, which are indicated by a broken line. In order to correct this distortion provision is made of the elements 40, 41, 42 and 43. Each of these elements has a stationary magnet and a rotatable magnet, which permit of adjusting readily and accurately the magnetic strengths of the fields between the pole-shoes.

If desired, the position of the adjustable magnet may be indicated by means of a dial or a pointer.

What is claimed is:

1. A magnetic assembly comprising a magnetic circuit including, magnetically coupled together, a soft magnetic portion and a permanent magnet system for producing a field of adjustable strength, said system comprising a pair of adjacent, coaxially-mounted, substantially-cylindrical, permanent magnets, each of said magnets being magnetized transversely to its axis, said magnets having about the same field strength, one of said magnets being rotatable about its axis and the other magnet being fixed to said soft magnetic portion, said other magnet comprising a hollow cylinder, said one magnet comprising a solid cylinder disposed within said hollow cylinder, and means for fixing said rotatable magnet in any one of a plurality of different positions relative to said fixed magnet.

2. A magnetic assembly comprising a magnetic circuit including a pair of soft magnetic portions and a permanent magnet system disposed between and magnetically in series therewith for producing a field of adjacent, co-strength, said system comprising a pair of adjacent, co-axially-mounted, right-prismatic permanent magnets, each of said magnets being magnetized transversely to its axis, said magnets having about the same field strength, and means associated with one of said magnets for withdrawing it from between the soft magnetic portions, rotating it about its axis relative to the other magnet, and reinserting it between the soft magnetic portions in any one of a plurality of different positions relative to the other magnet.

3. A magnetic assembly as set forth in claim 2 wherein said other magnet comprises a hollow prism, and said one magnet comprises a solid prism.

4. A magnetic assembly as set forth in claim 2 wherein the magnets each comprise solid right prisms.

5. A magnetic assembly as set forth in claim 2 wherein each of the magnets is constituted by a material having a hexagonal crystal structure and the formula $$MO \cdot 6Fe_2O_3$$

where M represents one of the metals selected from the group consisting of barium, strontium and lead.

6. A magnetic assembly comprising a closed magnetic circuit including magnetically in series a C-shaped soft magnetic core portion having a prismatic bore, an air-gap, and a permanent magnet system for producing a plurality of fixed fields of different strength in said air-gap, said system comprising a pair of adjacent, coaxially-mounted, right-prismatic, permanent magnets having the same shape as and mounted within the bore of said soft core portion, each of said magnets being magnetized transversely to its axis, said magnets having about the same field strength, and means coupled to one of said magnets for removing it from the bore, rotating it about its axis relative to the other magnet, and reinserting it within the bore.

References Cited in the file of this patent

UNITED STATES PATENTS

| | | |
|---|---|---|
| 2,347,023 | Beechlyn | Apr. 18, 1944 |
| 2,440,535 | Baranowski | Apr. 27, 1948 |
| 2,697,204 | Otzmann | Dec. 14, 1954 |

UNITED STATES PATENT OFFICE
CERTIFICATE OF CORRECTION

Patent No. 2,854,607 September 30, 1958

Wilfrid Franz Konrad Johann Niklas et al.

It is hereby certified that error appears in the printed specification of the above numbered patent requiring correction and that the said Letters Patent should read as corrected below.

Column 2, line 56, for "a cylindrical" read -- and a cylindrical --; column 3, line 70, for "provisions" read -- provision --; column 4, line 42, for "adjacent, co-" read -- adjustable --.

Signed and sealed this 10th day of February 1959.

(SEAL)
Attest:

KARL H. AXLINE

Attesting Officer

ROBERT C. WATSON
Commissioner of Patents